United States Patent [19]

Nicolas et al.

[11] 4,412,974

[45] Nov. 1, 1983

[54] PRODUCTION OF CARBON BLACK BY AN INCOMPLETE AIR-ACETYLENE COMBUSTION REACTION

[75] Inventors: Jacques Nicolas, Paris; Antoine Berger, Nantes; Christian Laminette, Lille, all of France

[73] Assignee: L'Air Liquide, Societe Anonyme pour l'Etude et l'Exploitation des Procedes Georges Claude, Paris, France

[21] Appl. No.: 339,480

[22] Filed: Jan. 15, 1982

Related U.S. Application Data

[63] Continuation of Ser. No. 160,683, Jun. 18, 1980, abandoned.

[30] Foreign Application Priority Data

Jul. 3, 1979 [FR] France .................. 79 17173

[51] Int. Cl.³ .................................. C09C 1/48
[52] U.S. Cl. ................... 422/156; 422/105; 422/111; 422/158; 239/424; 423/458
[58] Field of Search ............... 422/105, 114, 158, 152, 422/156, 153, 111; 423/458; 239/424, 426, 413, 424.5, 419.3, 416.1

[56] References Cited

U.S. PATENT DOCUMENTS

| | | | |
|---|---|---|---|
| 472,193 | 4/1892 | Nelson | 239/426 |
| 874,666 | 12/1907 | Gauthier et al. | 239/424.5 X |
| 2,436,282 | 2/1948 | Bennett | 422/111 |
| 2,635,946 | 4/1953 | Weber et al. | 422/158 X |
| 2,885,269 | 5/1959 | Erickson | 422/158 |
| 3,076,695 | 2/1963 | Claasen et al. | 422/158 X |
| 3,163,329 | 12/1964 | Mornas | 239/413 X |
| 3,203,767 | 8/1965 | Middlebrooks | 422/158 |
| 3,335,956 | 8/1967 | James | 239/424 X |
| 3,510,064 | 5/1970 | Crook et al. | 239/424 |
| 3,525,595 | 8/1970 | Zirngibl et al. | 422/158 |
| 3,649,206 | 3/1972 | Iverhel | 422/158 X |
| 4,022,383 | 5/1977 | Zeley | 239/424 X |
| 4,184,637 | 1/1980 | Mushenko et al. | 239/424 X |
| 4,246,232 | 1/1981 | Posch | 422/158 X |
| 4,250,145 | 2/1981 | Pobst et al. | 422/158 X |
| 4,294,814 | 10/1981 | Cheng | 422/156 X |

FOREIGN PATENT DOCUMENTS

| | | | |
|---|---|---|---|
| 450583 | 8/1948 | Canada | 239/426 |
| 973433 | 2/1951 | France . | |
| 1273122 | 11/1960 | France . | |
| 654081 | 6/1951 | United Kingdom . | |
| 673155 | 6/1952 | United Kingdom | 422/153 |
| 585200 | 12/1977 | U.S.S.R. | 423/458 |

Primary Examiner—Kenneth M. Schor
Attorney, Agent, or Firm—Lee C. Robinson, Jr.

[57] ABSTRACT

This invention relates to the production of carbon black by means of an incomplete air-acetylene combustion reaction.

The apparatus comprises heating means arranged around an acetylene jet and arranged to cause heat cracking of the acetylene molecules prior to the combustion reaction.

The invention is applicable in particular for forming linings for facing moulds or the like used in metallurgy or glass-making, for forming insulating facings on conveying elements and for lubricating drawing heads.

9 Claims, 5 Drawing Figures

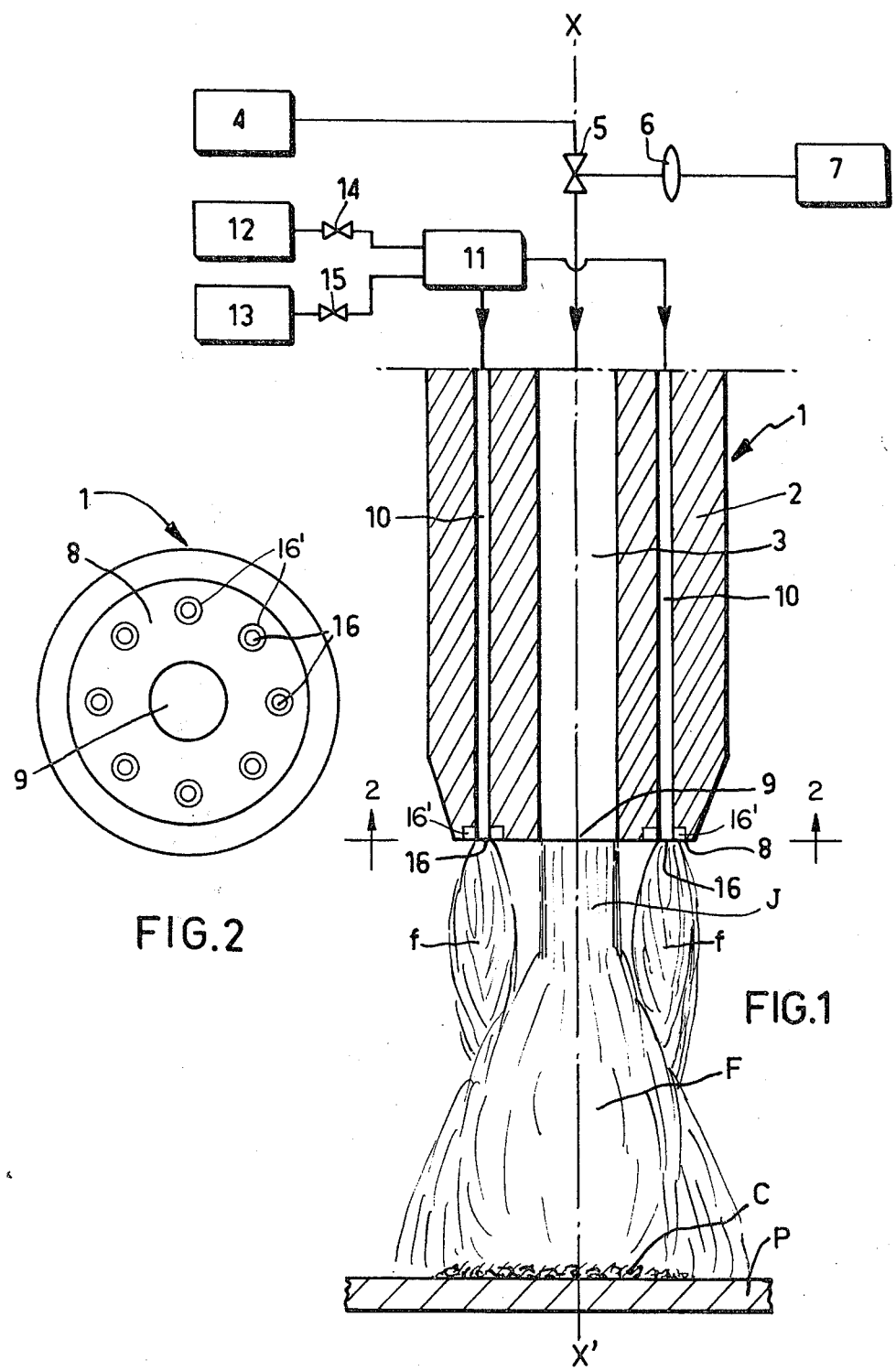

PRODUCTION OF CARBON BLACK BY AN INCOMPLETE AIR-ACETYLENE COMBUSTION REACTION

This is a continuation, of application Ser. No. 160,683 filed June 18, 1980, now abandoned.

BACKGROUND OF THE INVENTION

The present invention relates to the production of carbon black by means of an incomplete air-acetylene combustion reaction.

Carbon black has many industrial applications on account of its lubricating and heat insulating properties. It is thus applied in particular in metallurgy as a luting agent for moulds, ingot moulds, chill-casting moulds or the like, into which a molten metal is cast.

The carbon black produced by the apparatus known at present, which utilise incomplete combustion of acetylene in air, is of poor quality however, which is deleterious to particular industrial applications which are already known, and prevents the extension of its application to other industries.

For example, the granulometry of this carbon black which is a function of the air/$C_2H_2$ ratio, is thus difficult to control has a fatty consistency and the deposits formed on the metallurgical moulds have an uneven thickness, which implies an inconsistency in its lubricating capacity and in its heat insulating properties.

Furthermore, this carbon black obtained with known apparatus, contains aromatic hydrocarbons, such as benzene and naphtalene, which stick to the walls of the moulds or the like, and jeopardise their subsequent cleaning. These aromatic carbides act as bonders for the granules and endow the carbon black with a flocculent consistency.

Finally, the operation of such known apparatus is often disturbed by the deposits of tars on the air and acetylene feed pipes.

It is thus an object of the invention to minimise or eliminate the disadvantages hereinbefore referred to and to this end proposes a device which comprises heating means organised to cause heat cracking of the acetylene molecules prior to the aforesaid combustion reaction.

SUMMARY OF THE INVENTION

Accordingly, the invention encompasses apparatus for manufacturing carbon black by an incomplete airacetylene combustion reaction, which apparatus comprises a discharge orifice for delivering acetylene in the form of a jet, a plurality of heating nozzles situated close to said discharge orifice, and means for supplying said heating nozzles with a comburantfuel mixture whose combustion reaches the cracking temperature of the acetylene molecules, to effect a cracking action prior to the aforesaid incomplete airacetylene combustion reaction.

The cracking of the acetylene molecules prior to their combustion offers numerous advantages: the carbon black obtained has a finer and much more uniform granulometry than the earlier products; it is moreover practically free from benzenic hydrocarbons and forms practically no tars liable to impede the flow of the gases. The result is that homogeneous linings or lutings or high lubricating and insulating quality and unaffected by an adhesion liable to impede the cleaning of the said moulds, may be obtained on metallurgical moulds.

The fact that the acetylene appears in the form of a jet renders it possible to force the same to pass through the flames issuing from the heating nozzles, which facilitates its preheating considerably.

The heating nozzles or orifices may be distributed along a circle centered on the discharge orifice, in such a manner as to form a heating ring encircling the jet.

Such a heating ring encircling the acetylene jet assures optimum heat transfer conditions.

Advantageously, the apparatus also comprises means for controlling the acetylene jet delivery through the discharge orifice.

These control means enable the formation of carbon black layers at the required instant, at required locations and in any desired quantity. They also enable sequential acetylene injections, consequently of sequential deposits of carbon black, which renders the apparatus particularly appropriate for automatic casting plants, for example in which the moulds installed on a rotary or translatory conveyor are filled in turn with molten metal.

BRIEF DESCRIPTION OF THE DRAWINGS

In order that the invention may be more readily understood, reference will now be made to the accompanying drawings which show certain embodiments thereof by way of example, and in which:

FIG. 1, shows diagrammatically and in axialsection, apparatus in accordance with a first embodiment of the invention, together with the acetylene jet and the flame produced by the apparatus and the surface of a mould toward which the heat is directed.

FIG. 2 shows an end view of the apparatus of FIG. 1 along the lines 2—2 in FIG. 1.

DETAILED DESCRIPTION OF PREFERRED EMBODIMENTS

Figure 3:
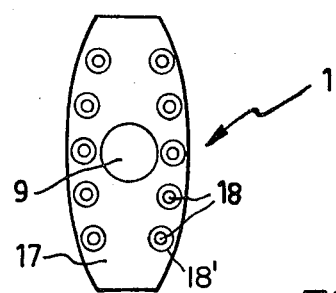
FIG. 3 also shows an end view of a second embodiment.

Referring now to the drawings, in the embodiment illustrated in FIGS. 1 and 2, the apparatus for manufacturing carbon black, is generally indicated by the reference 1, and comprises a hollow body 2 of revolution about axis XX'. The body 2 is provided internally with a central passage 3 arranged to be fed with acetylene from a pressurised source 4 to which it is connected via an inlet valve 5 controlled by means of a pneumatic element 6 which is itself connected to a compressed air source 7. The passage 3 opens at the front or nozzle part 8 of the body 2 via a central discharge orifice 9 which delivers an acetylene jet J. The device is fitted with means for heating this jet of acetylene and formed by a plurality of passages 10 housed within the body 2 and distributed circularly and evenly around the central passage 3. Each of these peripheral passages 10 is fed with a mixture of comburant and fuel (for example oxygen-methane or oxygen-ethane) by means of a mixer 11 which is itself connected to sources 12 and 13 (of comburant and fuel, respectively) via two control valves 14 and 15. Each of the passages fed by mixer 11 opens at the front part 8 of the body 2 via a heating orifice 16 of heating nozzle 16', these orifices forming on the said part 8 a circular heating ring, concentric with the discharge orifice 9, that is to say with the axis XX'. In operation, the combustion flames of the comburant-fuel mixture at the egress of the orifices 16 form a heating circle which surrounds the acetylene jet J. Ignition in the heating nozzles 16' is provided by any conventional means which is not shown in the drawings. The comburant-fuel mixture is adjusted to stoichiometric proportions, in such manner that the temperature of the heating circle is of the order of 1,400° C. At this temperature, the acetylene molecules of the jet J are exposed to heat cracking upon emerging from the orifice 9, prior to the reaction of incomplete combustion in air which then occurs while giving rise to a principal combustion flame F. The rates of flow of methane (or ethane) to the nozzles 16' and of acetylene to the discharge nozzle 9, are governed in such manner that 0.75 mol of methane (or ethane) corresponds to 1 mol of acetylene.

Upon being applied to the surface P of a mould, for example, the principal flame F causes the precipitation of a layer of carbon black C. The carbon black C has a fine and constant granulometry and is practically denuded of aromatic hydrocarbons, so that this carbon black does not stick to the mould surfaces and does not have a flocculent consistency.

The heating circle may be lit permanently whereas the acetylene may be discharged in successive sequences via the orifice 9 by means of the pneumatic control valve 5. With this arrangement sequential discharges of carbon black may be obtained at required instants, and the apparatus is particularly suitable for fitting to automatic casting plants, for example.

Figure 4:
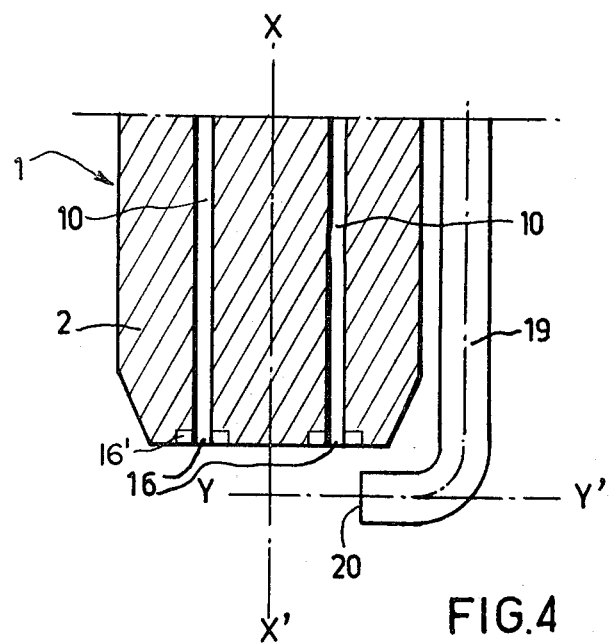
FIG. 4 shows diagrammatically and in axialsection, a third embodiment.
Figure 5:
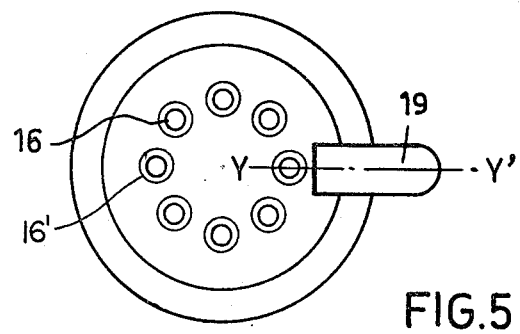
FIG. 5 is an end view from below of the apparatus shown in FIG. 4.

In the modified embodiment shown in FIG. 3, in which like references relate to like parts as in FIGS. 1 and 2, the apparatus illustrated differs from that of FIGS. 1 and 2 by the form of its front portion 17 which is elongated and not circular, and by the distribution of the orifices 18 of heating nozzles 18' which, by contrast to the nozzles 16', are aligned at each side of the discharge nozzle 9. This results in forming a double heating curtain enflanking the acetylene jet. In the modified embodiment of FIGS. 4 and 5, in which the like references also relate to like parts as in FIGS. 1 and 2, the acetylene pipe 19 and the discharge nozzle 20 are no longer co-axial with the axis XX', but the discharge nozzle 20 has its axis YY' set at right angles to axis XX', so that the acetylene jet passes radially through the heating circle.

The high quality of the carbon black obtained with apparatus in accordance with the invention allows of its application as a lining or luting means not only to metallurgical moulds or ingot moulds, but also to glass making moulds, to moulds used for production of goods of rubber or plastics materials, etc. It may also be applied to form an insulating coating for conveyor cylinders or chains bearing products at high temperature, thus preventing the onset of thermal shock. This carbon black may be substituted for conventional lubricants (oil or soaps) for wire-drawing heads.

We claim:

1. Apparatus for manufacturing carbon black by incomplete air-acetylene combustion reaction comprising:

a body which is provided with a passage and means defining a discharge orifice, in communication with said passage, for delivering a flow of a pressurized acetylene jet out of said body;

a plurality of heating nozzle means, having conduits leading thereto, provided in said body where said heating nozzle means are aligned in said body such that said heating nozzle means are means for directing and combusting a flow of comburant-fuel mixture passing through the heating nozzle means to heat the acetylene jet outside of said body at said discharge orifice means such that a cracking of acetylene molecules in the acetylene jet is effected prior to an incomplete air-acetylene combustion;

surface means for collection of and cooling of carbon black, the surface means located relative to said body such that said collection and cooling is effected; and means for providing acetylene to the acetylene passage;

means for providing the comburant-fuel mixture to the comburant-fuel conduits;

means for controlling the flows of the comburant-fuel mixture and acetylene such that said cracking is effected prior to said incomplete air-acetylene combustion and such that carbon black is formed and collected on said surface means.

2. Apparatus according to claim 1, wherein the plurality of nozzle means are distributed along a circle concentric with said discharge orifice means to form a heating ring encircling said jet.

3. Apparatus according to claim 1, further including supply means for supplying said plurality of heating nozzle means through said conduits with a comburant-fuel mixture adjusted to stoichiometric proportions in such a manner that the combustion temperature of said mixture is of the order of 1,400° C.

4. Apparatus according to claim 1, further including supply means for supplying said heating nozzle means through said conduits with a stoichiometric mixture of oxygen and methane.

5. Apparatus according to claim 1, further comprising means in connection with said discharge orifice means, for controlling the delivery of the acetylene jet by means of said discharge orifice means.

6. Apparatus according to claim 3, wherein said control means comprises a pneumatically operated valve.

7. Apparatus according to claim 1, wherein said heating nozzles are aligned in two rows to form a double heating curtain enflanking said jet.

8. Apparatus according to claim 1, wherein said heating nozzles are distributed along a circle having a central axis, and the orifice defining means includes a discharge portion having a longitudinal axis which is at a right angle to said central axis, said heating nozzles forming a heating circle traversed radially by said jet.

9. Apparatus according to claim 1 wherein said plurality of nozzle means surround said discharge orifice means.

* * * * *